United States Patent [19]

Bailey

[11] 4,441,725
[45] Apr. 10, 1984

[54] QUAD BOLT

[75] Inventor: Kent T. Bailey, Houston, Tex.

[73] Assignee: Thornhill Craver Company, Houston, Tex.

[21] Appl. No.: 366,914

[22] Filed: Apr. 9, 1982

[51] Int. Cl.³ .................... F16J 15/12; F16L 23/00
[52] U.S. Cl. ............................ 277/167.5; 277/236; 277/177
[58] Field of Search ............... 277/236, 167.5, 190, 277/191, 177

[56] References Cited

U.S. PATENT DOCUMENTS

| 2,330,425 | 9/1943 | Hilton | 277/167.5 |
| 2,764,311 | 9/1956 | Blackman | 277/167.5 |
| 3,329,447 | 7/1967 | Hitz | 277/167.5 |
| 3,501,158 | 3/1970 | Tillman | 277/167.5 |
| 3,918,725 | 11/1975 | Dryer | 277/167.5 |
| 4,214,763 | 7/1980 | Latham | 277/167.5 |

Primary Examiner—Robert T. Smith
Attorney, Agent, or Firm—Vinson & Elkins

[57] ABSTRACT

A coupling of two confronting hubs with a metal seal ring sealing between the confronting faces of the hubs and O-rings sealing between each hub and the metal seal ring together with a third environmental seal O-ring that seals against pressure in both directions to protect against environmental fluid reaching the metal ring and to provide a final seal in the event of failure of the metal seal ring and one of the O-rings in the groove receiving the metal seal ring.

2 Claims, 1 Drawing Figure

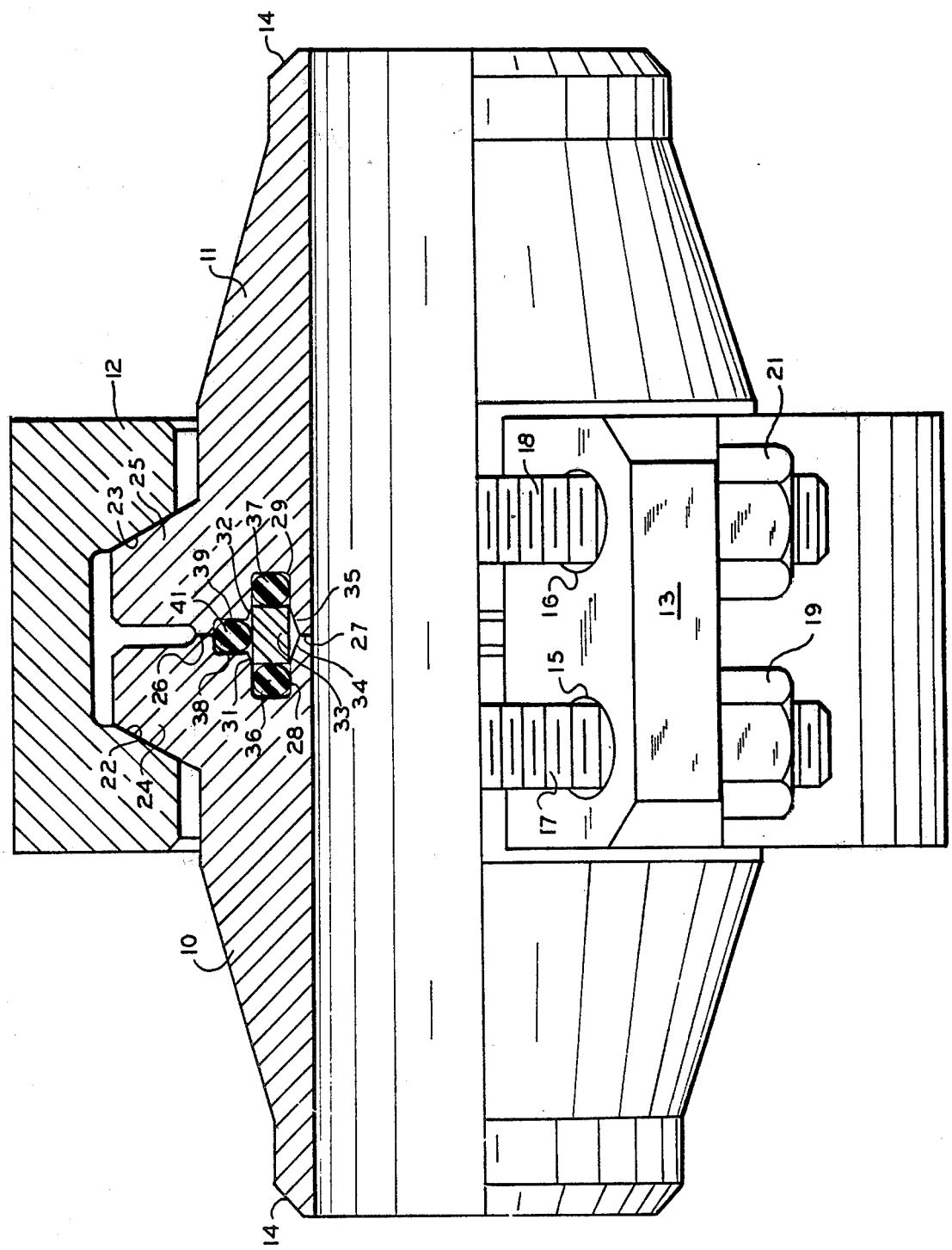

QUAD BOLT

This invention relates to couplings and more particularly to couplings for high pressure fluid.

It has been known to provide couplings with a malleable metal ring sealing between confronting faces of the couplings and to back up such a malleable seal with resilient seals. See U.S. Pat. Nos. 2,246,600; 3,094,337; 3,329,447; 3,455,566; and 4,034,993.

So far as is known utilizing of a malleable metal ring with backup O-rings has never been suggested in combination with an environmental seal to protect the metal seal ring against external fluids under pressure to avoid corrosion of the metal ring and at the same time provide a still further seal for containing pressure internally of the coupling in the event of failure of the metal ring and its associated O-rings.

An object of this invention is to provide a high pressure coupling with a malleable metal seal ring in combination with O-rings in the grooves receiving the metal ring to provide redundant seals and an environmental seal protecting the metal ring against external fluid under pressure, which also provides a redundant seal for pressure fluid within the coupling.

Another object is to provide a coupling as in the above object in which the environmental seal is in engagement with the metal seal.

In accordance with this invention, a coupling is provided and includes a pair of confronting hubs having inner and outer annular grooves in their confronting faces; means are provided for clamping the hubs in end-to-end abutment with at least the faces of the hubs immediately outboard of the outer grooves in engagement; a malleable metal seal ring is provided in the inner groove sealing between the confronting hub faces; an O-ring lies in the bottom of each inner groove sealing between the hub and the metal seal ring; and an O-ring is provided in the outer groove which seals against fluid flow in either direction to provide an environmental seal against external fluid under pressure which might corrode the metal seal ring and to seal against internal pressure in the event of failure of the metal seal ring and one or more of the O-rings in the inner grooves.

Preferably, the inner and outer grooves are provided by a two-step groove configuration with the deeper groove receiving the metal ring and the O-ring in the outer groove bearing directly against the metal ring.

In the single FIGURE the coupling is shown partially in elevation and partially in cross-section.

The coupling has a first hub 10 and a second hub 11 which are generally conventional in form and designed to be held in abutting relationship by the two-piece clamp 12 and 13.

The ends of each hub may be formed for securing in a line, such as being bevelled as at 14, to provide for welding of each hub to a pipe.

The clamp is provided by two identical C-shaped bodies 12 and 13 having holes 15 and 16 extending therethrough on both sides in the conventional manner. Bolts 17 and 18 extend through the holes 15 and 16 on each side of the clamp and suitable nuts 19 and 21 are made up on the bolts in the conventional manner to pull the two halves of the clamp together.

The two halves of the clamp are provided internally with bevelled surfaces 22 and 23 which cooperate with outwardly extending flanges 24 and 25 on the hubs 10 and 11, respectively. The flanges 24 and 25 have external surfaces which are mirror images of the confronting bevelled surfaces 22 and 23 on the clamp so that as the two clamp halves are pulled toward each other, they will slide along the flanges 24 and 25 on the hubs and force the two hubs into firm engagement with each other at least at the point 26 and preferably at the points 26 and 27. As will appear hereinafter, the engagement at point 26 supports a seal and thus the hubs should be engagement at least at this point.

Hub 10 is provided with an inner groove 28 and hub 11 is provided with a substantially identical inner groove 29. These confronting grooves have flared surfaces 31 and 32 on the outer portion of the mouth of the groove to provide sealing surfaces for engagement by the malleable metal ring 33 which is firmly engaged by these surfaces 31 and 32 as the clamp is tightened. The innermost surfaces of the groove are also provided with bevelled surfaces at 34 and 35 and these surfaces may also sealingly engage the metal ring 33, but such engagement is not depended upon for a final seal as the high pressure within the coupling tends to move the seal ring 33 away from these surfaces.

In the bottom of each of grooves 28 and 39 there is provided an O-ring 36 and 37. These O-rings 36 and 37 seal between the ring 33 and the hubs 10 and 11 in response to pressure acting on the O-rings from interior of the hub and moving the O-ring firmly into engagement with the outer walls of the groove and the metal ring 33 in the conventional manner.

Each hub 10 and 11 is provided with an outer groove 38 and 39, respectively. Preferably, the inner and outer grooves are provided by a two-step groove configuration with the deeper grooves 28 and 29 receiving the metal ring and the shallower grooves 38 and 39 opening directly into the deep grooves 28 and 29. The two-step configuration makes for ease in fabrication and two completely separate grooves could be employed, if desired.

Within the confronting grooves 38 and 39 there is provided a third O-ring 41 which seals between the confronting grooves 10 and 11 and provides a further backup in the event of failure of the metal ring 33 and one of the O-rings 36 and 37. In the event of such failure the seal 41 will provide a final seal for containing fluid within the coupling. As noted above, the confronting surfaces of the two hubs 10 and 11 engage each other at 26 to provide a support for the seal 41 in the event it is needed to function as a final seal.

The seal 41 provides an environmental seal and seals against flow of pressure fluid from the exterior of the coupling past the seal 41 and into contact with the metal ring 33. It is contemplated that the coupling may be used for underwater transmission of fluids and sea water or other fluids under pressure might cause corrosion of the metal seal 33. For this reason it is desirable to include the O-ring 41 which serves as an environmental seal and prevents external fluids under pressure from reaching the metal seal 33.

In the preferred form of the invention, as noted above, the inner and outer grooves are provided by a two-step configuration and with this configuration environmental seal 41 is supported directly by the metal ring 33, but seals with the bottom of the grooves 38 and 39 to prevent ambient fluid from reaching the ring 33.

The seal system will normally be made up in the coupling while not under pressure. Thus, as the clamp is tightened, all of the three O-rings will be placed under pressure. Then the clamp may be lowered below sea level as a part of a pipeline and the external seal 41 will be pressured inwardly by the hydrostatic pressure of the fluid in which it is immersed to force the seal 41 firmly into sealing engagement with the grooves 38 and 39 in hubs 10 and 11 to protect the metal ring 33 from external fluid under pressure.

When the line is pressurized, the seals 36 and 37 will be subjected to internal fluid pressure which will force them into firm contact with the malleable seal 33 and the grooves 28 and 29 to provide backups for the seal provided between the seal ring 33 and the surfaces 31 and 32 on the hubs 10 and 11, respectively.

From the above it will be seen that a coupling has been provided with a malleable metal seal backed up by O-rings, together with a third seal which will function in the event of failure of both the malleable metal seal ring and its two associated O-rings, and which third seal also functions as an environmental seal to protect the metal seal from corrosive external fluids.

The foregoing disclosure and description of the invention are illustrative and explanatory thereof and various changes in the size, shape and materials, as well as in the details of the illustrated construction, may be made within the scope of the appended claims without department from the spirit of the invention.

What is claimed is:
1. A coupling comprising,
a pair of confronting hubs,
confronting inner and outer annular grooves in the confronting faces of said pair of hubs,
means for clamping said hubs in end-to-end abutment with at least the faces of the hubs immediately outboard of the outer groove in engagement,
a malleable metal seal ring in said inner groove of each hub sealing between the confronting hub faces,
an O-ring in the bottom of each inner groove sealing between each hub and the metal seal ring, and
an O-ring in said outer groove sealing against fluid flow in either direction to provide an environmental seal against external fluid under pressure which might corrode the metal seal ring and to seal against internal pressure in the event of failure of the metal seal ring and one of the O-rings in one of said inner grooves.
2. The coupling of claim 1 wherein the inner and outer grooves are provided by a two-step groove configuration with the deeper groove receiving the metal ring, and the O-ring in the outer groove bearing against the metal ring.

* * * * *